United States Patent
Quan et al.

(10) Patent No.: US 9,100,967 B2
(45) Date of Patent: Aug. 4, 2015

(54) SYSTEM, METHOD AND APPARATUS FOR ALLOCATING WIRELESS CHANNELS IN A MULTI-CHANNEL ACCESS POINT

(75) Inventors: Zhi Quan, San Diego, CA (US); Simone Merlin, San Diego, CA (US); Hemanth Sampath, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/332,041

(22) Filed: Dec. 20, 2011

(65) Prior Publication Data

US 2013/0072214 A1 Mar. 21, 2013

Related U.S. Application Data

(60) Provisional application No. 61/535,705, filed on Sep. 16, 2011.

(51) Int. Cl.
*H04W 72/04* (2009.01)
*H04L 12/26* (2006.01)

(52) U.S. Cl.
CPC ........... *H04W 72/0493* (2013.01); *H04L 43/00* (2013.01)

(58) Field of Classification Search
CPC .................................................... H04L 1/0018
USPC ........................................................ 455/436
See application file for complete search history.

(56) References Cited

U.S. PATENT DOCUMENTS 7,403,505 B2 7/2008 Yoon et al.
7,453,844 B1 11/2008 Lee et al.
(Continued)

FOREIGN PATENT DOCUMENTS

EP 1022920 A2 7/2000
EP 1583284 A1 10/2005
(Continued)

OTHER PUBLICATIONS

Hande, P. et al., (May, 2009). "Distributed Load-Balancing in a Multi-Carrier Wireless System." Proceedings of the IEEE Wireless Communications and Networking Conference, pp. 1-6. Doi: 10.1109/WCNC.2009.4917674.
(Continued)

*Primary Examiner* — Charles Appiah
*Assistant Examiner* — Randy Peaches
(74) *Attorney, Agent, or Firm* — Kevin T. Cheatham

(57) ABSTRACT

Methods and apparatus provide for channel selection within a wireless network. A multi-channel wireless access point may select a channel for a wireless device requesting data or voice service based on the transmit times of each channel supported by the multi-channel wireless access point. The transmit times may be based on the physical rates of the devices assigned to each channel. The channel may also be selected based on the quality of service requested by the wireless device, the medium occupancy of each channel, or the number of wireless devices assigned to each channel. Alternatively the wireless device may select the channel for assignment based on channel statistics information provided by the multi-channel wireless access point. This information may be provided through one or more beacon signals, or supplied in response to a request for the information from a wireless device.

22 Claims, 8 Drawing Sheets

(56) References Cited

U.S. PATENT DOCUMENTS

| | | | |
|---|---|---|---|
| 7,650,151 B2 | 1/2010 | Medepalli et al. | |
| 8,477,606 B2 | 7/2013 | Chen et al. | |
| 2003/0202476 A1* | 10/2003 | Billhartz et al. | 370/236 |
| 2005/0227624 A1 | 10/2005 | Hiddink et al. | |
| 2009/0010164 A1 | 1/2009 | Wang et al. | |
| 2010/0029282 A1* | 2/2010 | Stamoulis et al. | 455/436 |
| 2010/0177756 A1 | 7/2010 | Choi et al. | |
| 2010/0248630 A1 | 9/2010 | Abraham et al. | |
| 2011/0058554 A1* | 3/2011 | Jain et al. | 370/392 |

FOREIGN PATENT DOCUMENTS

| | | | |
|---|---|---|---|
| EP | 1589781 | | 10/2005 |
| EP | 1988678 | A2 | 11/2008 |
| JP | 2003513534 | A | 4/2003 |
| JP | 2005020566 | A | 1/2005 |
| JP | 2007500969 | A | 1/2007 |
| JP | 2008312194 | A | 12/2008 |
| WO | WO-2008091350 | | 7/2008 |
| WO | 2010111416 | A1 | 9/2010 |
| WO | WO 2010111416 A1 * | | 9/2010 |

OTHER PUBLICATIONS

International Search Report and Written Opinion—PCT/US2012/055764—ISA/EPO—May 14, 2013.

* cited by examiner

SYSTEM, METHOD AND APPARATUS FOR ALLOCATING WIRELESS CHANNELS IN A MULTI-CHANNEL ACCESS POINT

TECHNICAL FIELD

The present application claims priority to provisional U.S. Application Ser. No. 61/535,705, entitled "USING MULTI-CARRIER WI-FI ACCESS POINTS FOR CELLULAR TRAFFIC OFFLOADING," filed Sep. 16, 2011, assigned to the assignee hereof and incorporated herein by reference.

DESCRIPTION OF THE RELATED TECHNOLOGY

The technical sophistication and power of wireless devices continues to advance. For example, the first generation of smart phones provided data services such as email and web browsing to their users. These initial data services utilized the existing voice network to send and receive data to support these new data services. While this architecture provided basic data services capabilities to users, and was clearly a technological advance as compared to voice only mobile devices, it also had some disadvantages. For example, the data traffic generated to support these applications utilized networking resources on the cellular network that could also be used for delivering voice communications. To accommodate these new services, cellular carriers were required to build their cellular networks with enough capacity to sustain the combined data and voice traffic. This additional voice network capacity required substantial expenditure by the cellular network providers to ensure enough cellular network capacity for both data and voice.

Recently, newer generations of mobile devices have included a capability to connect to Wi-Fi networks, such as those based on the IEEE 802.11 specifications. The connection to a Wi-Fi network may allow these mobile devices to provide data services to their users using the Wi-Fi connection, avoiding bandwidth consumption on the relatively expensive cellular networks. Many smart phones continue to provide the capability to send and receive data over their voice network when a Wi-Fi connection is unavailable, but when connected to a Wi-Fi network, may elect to send data over the Wi-Fi network instead. This design saves cost for both the mobile access provider and subscriber, as Wi-Fi networks are generally land-based and less expensive to maintain and operate when compared to cellular networks. By offloading data traffic to the Wi-Fi network, expensive cellular network bandwidth is preserved.

However, voice traffic alone remains a substantial cost driver for cellular network providers. If voice traffic could also be off-loaded to Wi-Fi networks, additional cost savings are possible. However, there are several problems with offloading voice traffic to shared data networks. For example, while the performance of data applications such as email and web browsing can vary without a significant degradation in perceived quality, voice communications channels have more demanding performance requirements. Past attempts at offloading voice traffic to Wi-Fi networks have experienced performance problems that make the quality of the voice call unacceptable to most users.

SUMMARY

The systems, methods and devices of the disclosure each have several innovative aspects, no single one of which is solely responsible for the desirable attributes disclosed herein.

The methods, apparatus, and systems described herein relate to wireless networking systems that allocate a channel in a multi-channel access point to a wireless device. In some implementations, the wireless access point may select the channel to be assigned to the wireless device. In other implementations, the wireless device may select the channel, based on statistical channel information provided by the wireless access point.

In some implementations, a channel with the lowest transmit time may be allocated to a wireless device that is requesting a voice or data connection. In other implementations, a channel may be allocated to a wireless device based on usage statistics. In still other implementations, a round robin scheduling method may be used to assign a channel to a wireless device.

The methods, apparatus, and systems disclosed may also ensure adequate performance of a channel before allocating a channel to a mobile device. For example, if the wireless channel is assigned by a multi-channel wireless access point, a wireless device may specify a quality of service level required for its data service when requesting a channel. If opening a channel for traditional data services such as email and web browsing, the wireless device may specify modest quality of service levels. However, when a wireless device attempts to offload a voice connection to a Wi-Fi network, a more demanding quality of service level may be specified. If a wireless access point does not have a channel available that meets the quality of service level specified by the wireless device, no channel may be assigned to the wireless device.

In implementations that provide for the wireless device itself to select a channel, the wireless access point may provide information to the wireless device to enable the wireless device to determine whether any of the channels supported by the multi-channel wireless access point can meet its quality of service requirements. If one or more channels meets the wireless device's quality of services requirements, one of those channels may be selected by the wireless device.

One innovative aspect of the subject matter described in this disclosure can be implemented in a method in a wireless device for receiving statistical information for a plurality of channels supported by a multi-channel wireless access point providing data or voice service. The method may include transmitting a network request to the wireless access point for data or voice service, and receiving a network reply from the wireless access point providing statistical information for a plurality of channels supported by the multi-channel wireless access point. Some implementations of the method may also include comparing data derived from the statistical information to a threshold, and selecting one of the plurality of channels for data or voice traffic on the wireless device if the comparison indicates a channel can provide a performance level corresponding to the threshold. In some implementations of the method, the statistical information includes the number of active connections for each of the plurality of channels. In some other implementations of the method the statistical information includes a medium occupancy of each of the plurality of channels and the method includes selecting one of the plurality of channels based on the medium occupancy of each of the plurality of channels.

Some implementations of the method use statistical information that includes representations of the physical rates of each device assigned to each of the plurality of channels, and the method includes selecting one of the plurality of channels based on the representations of the physical rates. In implementations of the method, the statistical information includes a transmit time for each of the plurality of channels, and the method includes selecting one of the plurality of channels based on the transmit time for each of the plurality of channels. In some of these implementations, a transmit time of a channel is based at least in part on the physical rates of devices assigned to the channel. In some implementations of the method a transmit time of a channel is based at least in part on the number of active connections on the channel.

Some other innovative aspects disclosed include a wireless device. The wireless device may include a wireless transmitter, a wireless receiver, a transmit module, configured to make a request to a multi channel wireless access point for data or voice services, and a receive module, configured to receive a network reply from the multi-channel wireless access point providing statistical information for a plurality of channels supported by the multi-channel wireless access point. In some implementations of the wireless device, the wireless device may also include a channel selection module configured to select a channel from the plurality of channels based at least in part on the statistical information.

In some other implementations of the wireless device, the statistical information includes at least the transmit time for each of the plurality of channels, and the channel selection module is further configured to select a channel based on the transmit times. In some implementations, a transmit time of a channel is based at least in part on the physical rates of the devices assigned to the channel. In some implementations the wireless device is a wireless telephone.

Another innovative aspect disclosed herein includes a wireless apparatus including means for transmitting a network request to the wireless access point for data or voice service, and means for receiving a network reply from the access point providing statistical information for a plurality of channels supported by the multi-channel wireless access point. Some of these wireless apparatus may also include means for comparing data derived from the statistical information to a threshold, and means for selecting one of the plurality of channels for data or voice traffic on the wireless device if the comparison indicates a channel can provide a performance level corresponding to the threshold.

Other innovative aspects include a non transitory, computer readable media including instructions that when executed by a processor, cause the processor to transmit a network request to a multi-channel wireless access point for data or voice service, and receive a network reply from the multi-channel wireless access point providing statistical information for a plurality of channels supported by the multi-channel wireless access point. Some of the computer readable media may also include instructions that when executed by a processor, cause the processor to compare data derived from the statistical information to a threshold, and select one of the plurality of channels for data or voice traffic on the wireless device if the comparison indicates a channel can provide a performance level corresponding to the threshold.

Another innovative aspect includes a method of assigning a wireless device to a channel in a multi-channel access point, comprising receiving a network request from a wireless device for data or voice services, determining the transmit times for a plurality of channels, selecting a wireless channel from the plurality of channels based at least in part on the transmit times, assigning the wireless device to the selected channel to provide data or voice services, and transmitting a network reply to the wireless device indicating the selected channel. In some implementations, the transmit time of a channel is based on the number of wireless devices assigned to the channel. In some implementations, a transmit time of a channel is based at least in part on the physical rates of wireless devices assigned to the channel. In some implementations of the method the network request includes a channel performance requirement and the channel is selected based at least in part on the channel performance requirement. The channel performance requirement may be a quality of service requirement.

Another innovative aspect includes a multi-channel access point. The multi-channel access point includes a wireless transmitter, a wireless receiver, a network interface, configured to connect over a plurality of wireless channels, a receive module, configured to receive a request from a wireless device for data or voice services, a transmit time determination module, configured to determine transmit times for a plurality of channels; a channel selection module, configured to select a channel for the wireless device based at least in part on the transmit times, a channel assignment module, configured to assign the wireless device to the selected channel to provide data or voice services, and a send module, configured to send a reply to the wireless device indicating the selected channel.

In some implementations of the multi-channel access point, the transmit time determination module is configured to determine a transmit time of a channel based at least in part on the physical rates of devices assigned to the channel.

Another innovative aspect may include a multi-channel wireless access point, including means for receiving a network request from a wireless device for data or voice services, means for determining the transmit times for a plurality of channels, means for selecting a wireless channel from the plurality of channels based at least in part on the transmit times, means for assigning the wireless device to the selected channel to provide data or voice services, and means for transmitting a network reply to the wireless device indicating the selected channel.

Another innovative aspect may include a non transitory, computer readable media including instructions that when executed by a processor, cause the processor to receive a network request from a wireless device for data or voice services, determine the transmit times for a plurality of channels, select a wireless channel from the plurality of channels based at least in part on the transmit times, assign the wireless device to the selected channel to provide data or voice services, and transmit a network reply to the wireless device indicating the selected channel.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
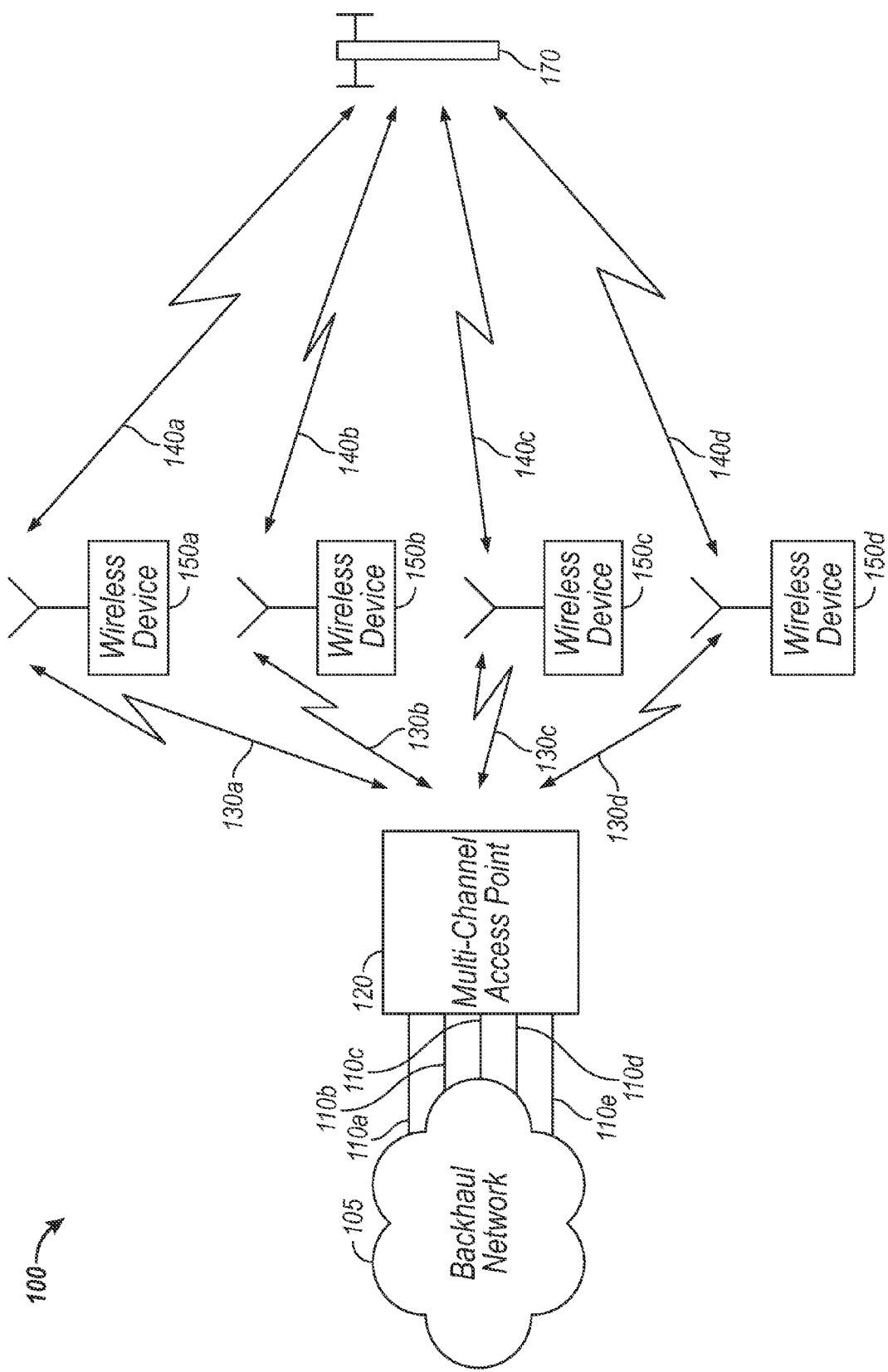
FIG. 1 illustrates a wireless communication system that includes a multi-channel access point, a back-haul network, and a plurality of mobile devices.

The following description is directed to certain implementations for the purposes of describing the innovative aspects of this disclosure. However, a person having ordinary skill in the art will readily recognize that the teachings herein can be applied in a multitude of different ways. Thus, the teachings are not intended to be limited to the implementations depicted solely in the Figures, but instead have wide applicability as will be readily apparent to one having ordinary skill in the art.

As described above, it may be desirable to off load at least a portion of a mobile device's voice traffic to lower cost data networks when a mobile device is connected to a Wi-Fi network such as an 802.11 network. However, past attempts to off-load voice traffic to data networks have resulted in lower voice quality, dropped calls, and reduced customer satisfaction. One embodiment relates to methods and systems that reduce these problems by assigning a substantially equal number of mobile devices to each channel supported by a multi-channel wireless access point (MC-WAP). In communication environments that experience wireless devices of relatively equivalent network usage profiles, this may load balance the multiple channels supported by the multi-channel wireless access point. Some implementations may assign wireless devices using a round robin scheduling process.

In other implementations, the wireless device may be responsible for selecting a particular channel available from the MC-WAP. In these implementations, the wireless device may first receive statistical information from the MC-WAP indicating the number of devices using each channel supported by the MC-WAP. The wireless device may then select a channel that has the lowest number of wireless devices using the channel. Alternatively, the wireless device may determine that all of the channels supported by the MC-WAP have usage levels above a threshold, and then determine not to open a connection on any of the MC-WAP supported channels.

Other implementations may select a wireless channel for a mobile device based on the transmit times of each channel supported by the MC-WAP. These methods and apparatus may calculate the transmit times of each channel supported by the MC-WAP. The channel with the lowest transmit time may be allocated to a requesting mobile device. Some implementations may assign the channels so as to minimize the difference in transmit times between the channels. This method may achieve higher throughput while also providing more equal opportunity for any mobile device to access the Wi-Fi channels.

In other implementations, the transmit times of one or more channels may be provided by the MC-WAP to a mobile device requesting a channel. The mobile device may then determine whether one of the one or more transmit times provided by the MC-WAP meet the mobile device's data transmission requirements. If the wireless device identifies a channel with an acceptable transmit time, the mobile device may be assigned to that channel and may transmit voice or other data on that channel.

The determination of a transmit time may vary by implementation. In some implementations, the transmit times may be determined based on the physical rates of the devices using the channel. The physical rate may represent a transmit rate of a channel in bits per second. This rate may include data considered overhead in its representation. For example, overhead from the physical layer or MAC layer may be included. In other implementations, the transmit time of a channel may be determined based on the number of devices assigned to the channel. In some other implementations, the transmit time of the channel may be determined, at least in part, based on the number of devices assigned to the channel and the physical rates of the devices using the channel.

In some other implementations, user traffic patterns and quality of service requirements of the wireless devices may be considered. In these implementations, a MC-WAP may only assign a channel to a wireless device if the channel is able to meet the requirements specified by the wireless device. If none of the channels supported by the MC-WAP are able to meet the requirements defined by the wireless device, the wireless device may not associate with the MC-WAP. Alternatively, the wireless device may lower its requirements so as to be within the capabilities of an available channel provided by the MC-WAP.

These methods and systems provide for a channel allocation architecture that allows efficient handling of voice calls through a MC-WAP. In some implementations, when a request is received from a wireless device by a MC-WAP, the MC-WAP may calculate a throughput metric for each channel it supports. The throughput metric may be calculated based on parameters such as the medium occupancy of the channel, the number of existing wireless devices assigned to that channel and their corresponding physical rates. The throughput metric may represent a data rate for the payload portion of data traffic using a channel supported by the MC-WAP. If the MC-WAP identifies one or more channels that meet the requirements requested by the wireless device, the MC-WAP may assign the wireless device to a qualified channel.

Alternatively, the wireless device may select a channel based on information obtained from the MC-WAP about channels supported by the MC-WAP. In some implementations, the MC-WAP may provide a beacon signal that communicates information about the channels it supports. For example, a beacon signal may include the medium occupancy and/or the current number of wireless devices associated with each channel. Based on information provided in the beacon signal, a wireless device may estimate the throughput available based on the medium occupancy, the physical rates and the MAC protocol used by the MC-WAP. Alternatively, the beacon signal provided by the MC-WAP may provide available throughput metrics. The wireless device may then more easily determine whether the throughput of the channels available at the MC-WAP will meet its data communication requirements.

Some implementations have one or more of the following potential advantages. Because the disclosed methods may ensure a channel provided by a MC-WAP has sufficient capacity to meet the performance requirements of a wireless device, the quality of voice calls off loaded to the MC-WAP may be improved. This may lead to reduced costs for wireless providers by reducing traffic on expensive cellular networks in favor of less expensive Wi-Fi based networks.

The disclosed methods and apparatus may have a further advantage of increasing total capacity of the channels supported by the MC-WAP. Since channels are allocated more efficiently, a larger amount of traffic may be carried by the MC-WAP while maintaining a level of performance than may not be achieved using prior art methods.

FIG. 1 illustrates a wireless communication system that includes a plurality of mobile devices 150a-d, a multi-channel wireless access point (MC-WAP) 120, a back-haul network 105, and a cellular base station 170. Wireless devices 150a-d communicate with the cellular base station 170 over radio communication links 140a-d to send and receive voice calls. Note that while FIG. 1 illustrates only one cellular base station 170, an actual wireless communication system may include hundreds or thousands of cellular base stations. Additionally, although each mobile device 150a-d is illustrated as in radio communication with a single cellular base station 170, actual wireless communication systems implementing the methods and apparatus disclosed herein include wireless devices that communicate with a diverse set of cellular base stations, based at least in part on the proximity of the wireless device to the cellular base station.

Wireless devices 150a-d also may communicate with MC-WAP 120. This communication, as shown by radio signals 130a-d, may utilize well known "Wi-Fi' protocols such as 802.11 to send and receive data between multi-channel access point 120 and wireless devices 150a-d. MC-WAP 120 may also communicate with a backhaul network 105 over a series of channels 110a-e. The connection between the MC-WAP 120 and backhaul network 105 may be via any known network link technology.

Wireless devices 150a-d may send data to remote nodes (not shown) via back-haul network 105 using multi-channel access point 120. This data transfer may support applications running on wireless devices 150a-d such as email, instant messaging, web browsing, streaming audio or video, or any of a myriad of applications that run on wireless devices 150a-d and exchange data with nodes on a network accessible via multi-channel access point 120.

Figure 2:
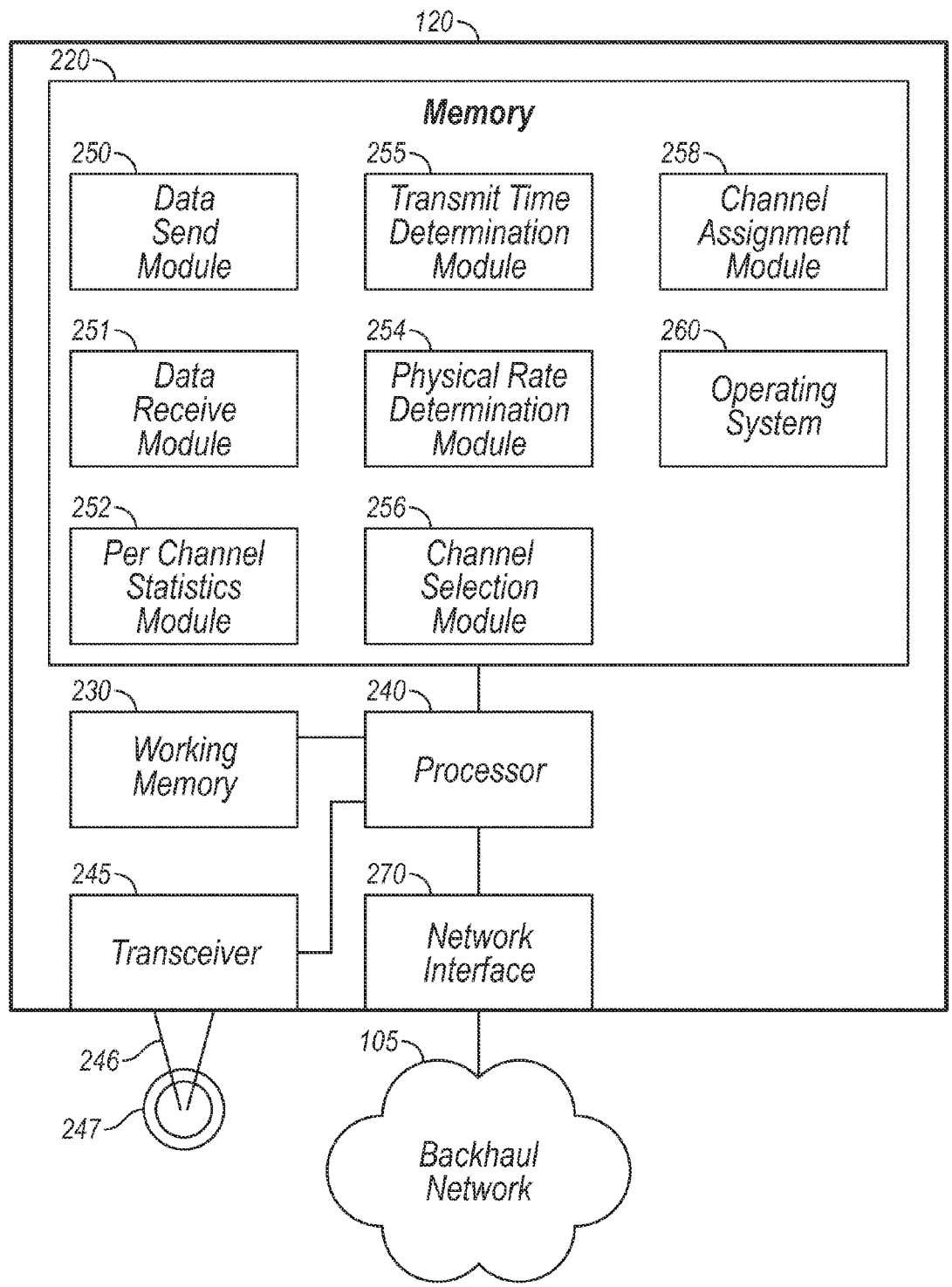
FIG. 2 is a block diagram of a multi-channel access point implementing at least one of the operative embodiments.

FIG. 2 is a block diagram showing additional features of the MC-WAP 120 from FIG. 1 and implementing at least one of the operative embodiments. The MC-WAP 120 includes a processor 240 that is operatively coupled to a memory 220, working memory 230, transceiver 245, and network interface 270. Transceiver 246 may transmit radio signals 247 over integrated antenna 246.

The memory 220 includes several modules, described below, that have instructions that can configure processor 240 to perform various functions. For example, the memory 220 includes a data receive module 251 which may include instructions that configure processor 240 to receive data from the transceiver 245 or the network interface 270. In some implementations, a wireless device may send a request for data or voice services to MC-WAP 120. This request may be received by instructions that configure processor 240 to receive the request via transceiver 245. Therefore, instructions in data receive module 251 may be one means for receiving a network request from a wireless device for data or voice services.

The memory 220 also includes a transmit time determination module 255. The transmit time determination module may determine transmit times for devices associated with each channel supported by the MC-WAP. Therefore, instructions in a transmit time determination module may represent one means for determining transmit times for a plurality of channels.

The memory 220 also includes channel selection module 256 that may have instructions that configure the processor 240 to determine a channel to assign to a wireless device that is requesting wireless data transfer service from MC-WAP 120. After the transmit times are determined as described above, channel selection module 256 of MC-WAP 120 may select a wireless channel from a plurality of channels based at least in part on the transmit times. Therefore, channel selection module 256 represents one means for selecting a wireless channel from a plurality of channels based at least in part on the transmit times.

The memory 220 also includes a channel assignment module 258. The channel assignment module 258 may include instructions to assign a channel selected by the channel selection module 256 to a wireless device. Therefore, instructions in a channel assignment module may represent one means for assigning the wireless device to a selected channel to provide data or voice services.

The memory 220 also includes a data send module 250 which may include instructions that configure processor 240 to send data over the transceiver 245 or the network interface 270. For example, in response to the request described previously, MC-WAP may select a channel to assign to the wireless device, and send a network reply to the wireless device. Therefore, instructions in data send module 250 may represent one means for transmitting a network reply to a wireless device indicating a selected channel.

The memory 220 also includes a physical rate determination module 254. The physical rate determination module 254 may include instructions that configure processor 240 to determine the physical rates on each of the channels supported by the MC-WAP 120. The memory 220 also includes a per channel statistics module 252 that includes instructions that configure the processor 240 to maintain statistics for each of the channels supported by the MC-WAP 120. For example, the channel statistics module 252 may maintain the number of wireless devices currently using each channel supported by the MC-WAP.

The memory 220 also includes an operating system module 260 that is configured to manage the hardware and software resources of the MC-WAP 120.

The working memory 230 within the MC-WAP 120 may be used to store dynamic data used by the processor 240 in performing the functions of the MC-WAP 120. Alternatively, the working memory 230 may temporarily store instructions from any of the modules that are part of the memory 220, for example, when those instructions are executed by processor 240. The transceiver 245 may be used by the processor 240 to communicate with other wireless devices. For example, the MC-WAP 120 may communicate with the wireless devices 150a-d as illustrated in FIG. 1 using the transceiver 245. The network interface 270 may be used by the MC-WAP 120 to communicate with the back-haul network 105.

Figure 3:
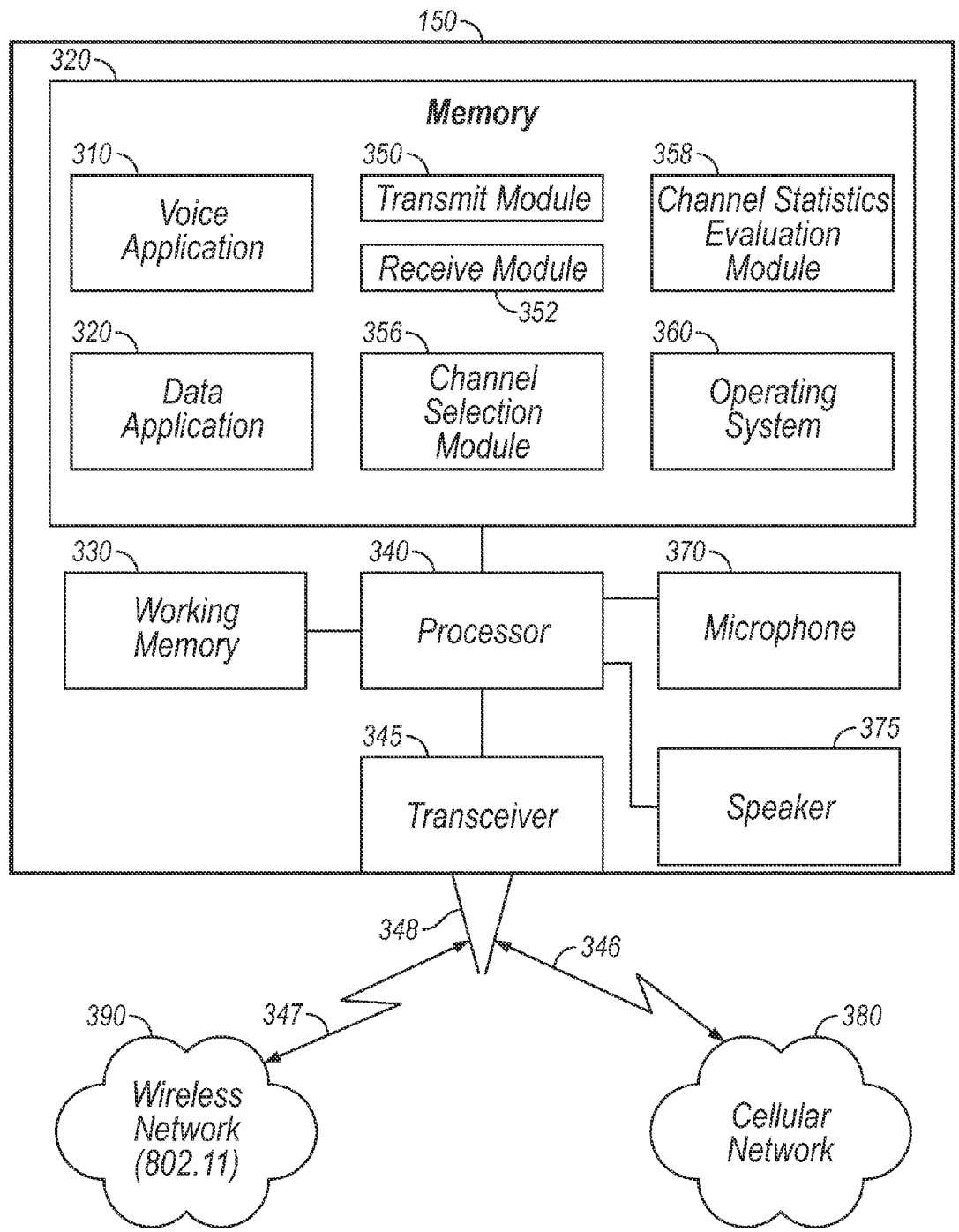
FIG. 3 is a block diagram of a mobile device implementing at least one of the operative embodiments.

FIG. 3 is a block diagram of the wireless device 150 implementing at least one of the operative embodiments. As shown, the wireless device 150 includes a processor 340 that is operatively connected to a memory 320, working memory 330, transceiver 345, microphone 370 and speaker 375. Transceiver 345 transmits and receives radio signals 346 and 347 via antenna 348. This provides connectivity with cellular network 380 and wireless network 390 respectively.

The memory 320 includes several modules that include instructions that configure processor 340 to perform functions of the device 150. For example, the memory 320 includes a voice application 310 that includes instructions that configure the processor 340 to send and receive voice communication. For example, the voice application 310 may receive data from the microphone 370 and send the data using the transmit module 350 over the transceiver 345. The memory 320 also may include a data application 320. The data application 320 may be for example, an email application, web browser application, streaming audio or video application, or any other application that sends or receives data over a network connection. Instructions in the data application 320 may configure the processor to send or receive data using the transmit module 350 or the receive module 352.

As mentioned, the memory 320 may also include the transmit module 350 that includes instructions that configure the processor 340 to transmit data using the transceiver 345. In some implementations, the wireless device 150 may transmit a request to a MC-WAP for data or voice service. Therefore, the transmit module 350 may represent one means for transmitting a request to a multi-channel wireless access point for data or voice services.

The memory 320 may also include a receive module 352 that may include instructions that configure the processor 340 to receive data using the transceiver 345. For example, the receive module 352 may represent one means for receiving a network reply from a MC-WAP that provides statistical information for a plurality of channels supported by the MC-WAP.

Some implementations of the wireless device 150 may include a channel statistics evaluation module 358. This module may include instructions that configure processor 340 to evaluate statistics received from a MC-WAP to determine whether any channel supported by the MC-WAP provides network performance that meets wireless device 150's performance requirements. This determination may be done by comparing statistical information received in a network reply from an access point to a performance threshold. In some implementations, the performance threshold may represent a minimum throughput or bandwidth requirement of the wireless device. In other implementations the performance threshold may represent a maximum latency required by the wireless device. Some implementations may use a performance threshold that represents a combination of latency, throughout, bandwidth, along with other network performance factors. Therefore, instructions in a channel statistics evaluation module may represent one means for comparing data derived from statistical information to a performance threshold.

Some implementations of wireless device 150 may include a channel selection module 356. The channel selection module 356 may select a channel to use for transmission and reception of data. For example, channel selection module may select a channel to send or receive data for the voice application 310 or the data application 320. The channel selection module 356 may select a channel based on evaluation of the statistical information received from a multi-channel wireless access point, performed in some implementations by channel statistics evaluation module 358. Therefore, instructions in a channel selection module 358 may represent one means for selecting a channel from a plurality of channels based at least in part on statistical information.

The memory 320 may also include an operating system module 360 that is programmed or configured to manage the hardware and software resources of the wireless device 150.

The wireless device 150 may also include a working memory 330. The working memory 330 may store dynamic data needed to perform the functions of the wireless device 150. The wireless device 150 may also include a microphone 370 to receive audio signals from a user and a speaker 375 to generate audio signals for a user. The transceiver 345 of the wireless device 150 may be used to send and receive data with a cellular network or a wireless access point, such as the multi-channel wireless access point illustrated in FIG. 1 and FIG. 2.

Figure 4:
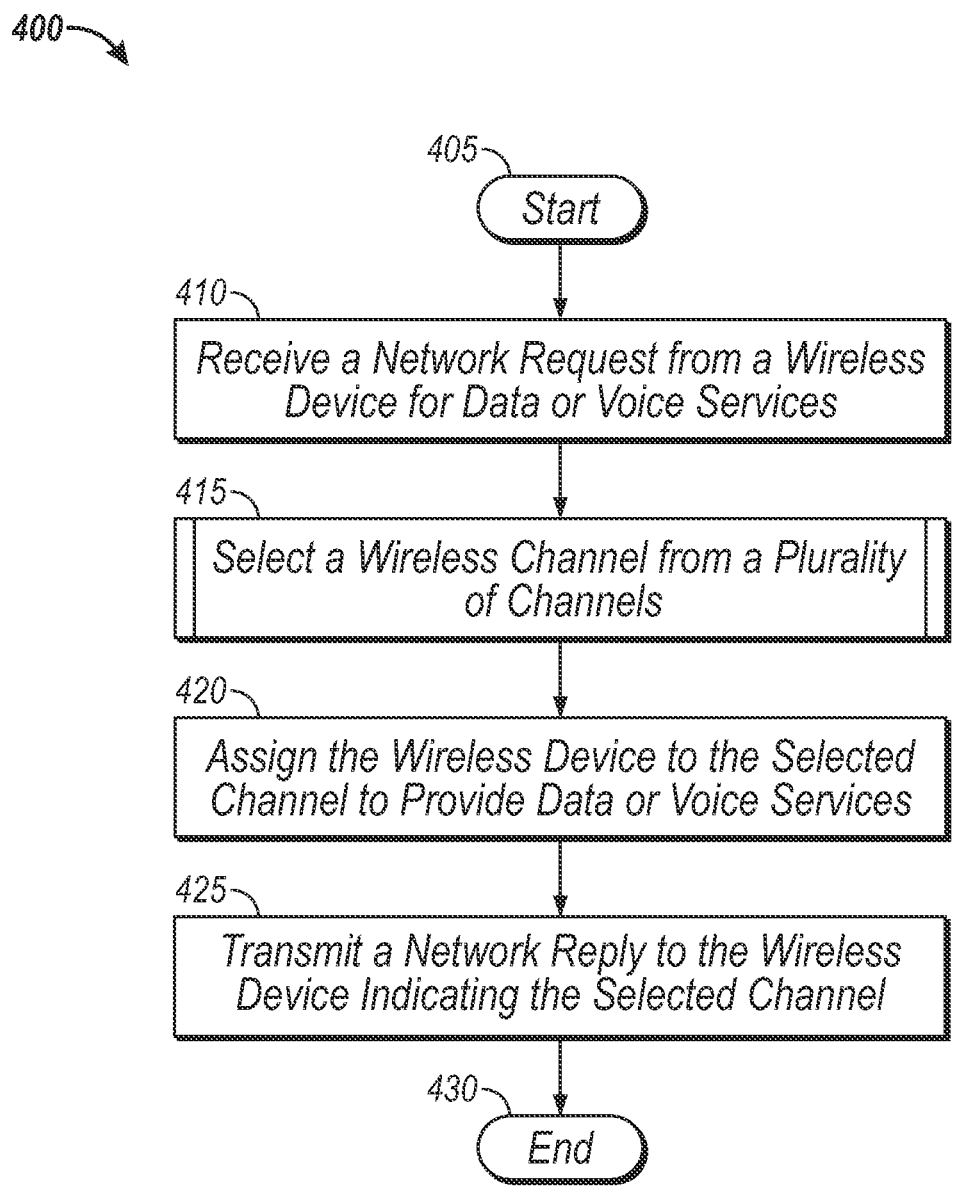
FIG. 4 is a flowchart of a process for allocating a channel to a wireless device.

FIG. 4 is a flowchart of a process 400 for allocating a channel to a wireless device. Process 400 may be implemented in whole or in part by processor instructions included in any of the modules of the MC-WAP 120, illustrated in FIG. 2. For example, instructions in a combination of the data send module 250, data receive module 251, channel selection module 256, and channel assignment module 258 may implement process 400. Process 400 may be used in implementations that give responsibility to the MC-WAP for selecting a channel for a wireless device.

The process 400 begins at start block 405 and then moves to block 410 where a request from a wireless device for data or voice services is received by the MC-WAP 120. The process 400 then moves to process block 415. In block 415, a wireless channel is selected from a plurality of available wireless channels. Additional details on the steps performed in process block 415 can be found with reference to FIG. 7 below. The process 400 then moves to block 420. In block 420, the MC-WAP assigns the requesting wireless device to the selected channel in order to provide data or voice services. The process 400 then moves to block 425 where a network reply is transmitted to the wireless device indicating the selected channel. The process 400 then moves to end state 430.

Figure 5:
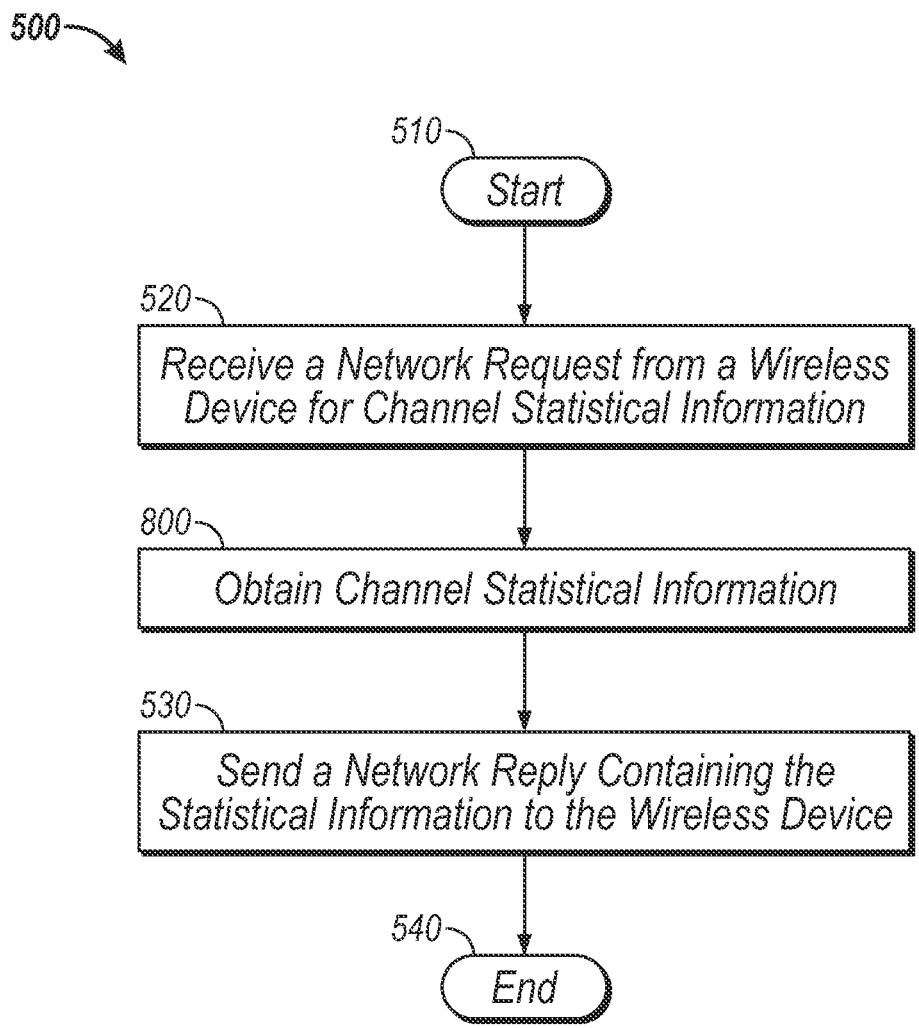
FIG. 5 is a flowchart of a process for providing channel statistical information to a wireless device.

FIG. 5 is a flowchart for a process 500 for providing channel statistical information to a wireless device. The process 500 may be implemented by the MC-WAP illustrated in FIG. 1 and FIG. 2. For example, process 500 may be implemented by instructions included in the data send module 250, the data receive module 251 and per channel statistics module 252. Process 500 may be used in implementations that provide for the selection of a channel to be performed by a wireless device, and not directly by the MC-WAP. In these implementations, the MC-WAP may simply provide channel statistics information to the wireless device that enable the wireless device to make a decision about whether to utilize a channel supported by the MC-WAP for data or voice service. The information provided by MC-WAP may also enable the wireless device to determine which channel of a plurality of channels provided by the MC-WAP to choose for a particular data or voice service.

The process 500 begins at start block 510 and then moves to block 520, where a network request from a wireless device for channel statistical information is received. Process 500 then moves to block 800 where channel statistical information is obtained. More detail on how channel statistics are obtained will be provided below in the discussion of FIG. 8. Process 500 then moves to block 530, where a network reply containing the channel statistical information is sent to the wireless device. The process 500 then moves to end block 540.

Figure 6:
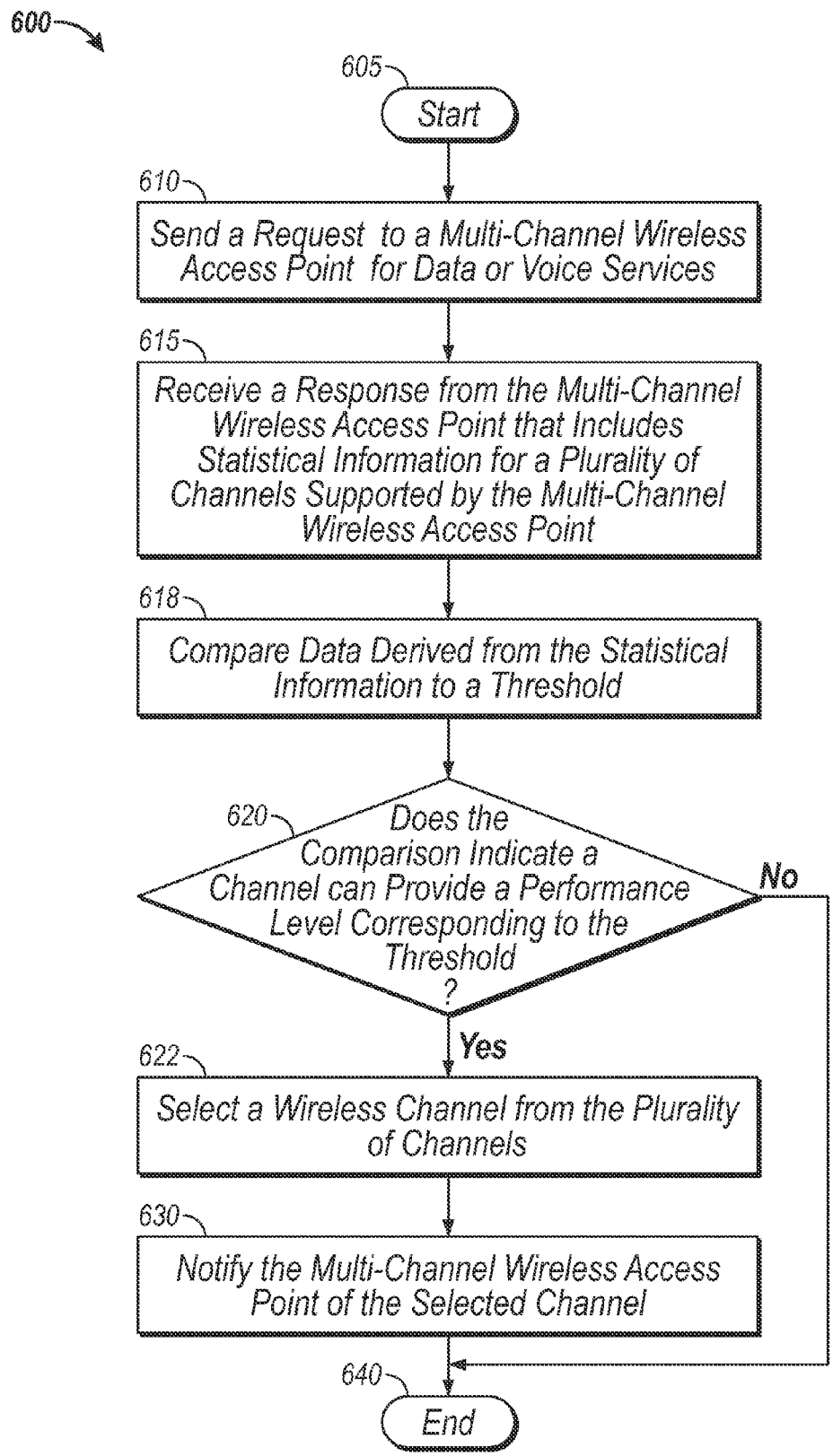
FIG. 6 is a flowchart of a process for selecting a channel supported by a multi-channel wireless access point within a wireless device.

FIG. 6 is a flowchart of a process 600 for selecting a channel supported by a MC-WAP within a wireless device. This differs from the process of FIG. 4 or FIG. 5, wherein the MC-WAP selected a channel for the wireless device. Process 600 may be implemented by instructions included in the wireless device 150 illustrated in FIG. 3. For example, the process 600 may be implemented by instructions with the transmit module 350, receive module 352, channel selection module 356, channel statistics evaluation module 358, of FIG. 3.

The process 600 begins at start block 605 and then moves to block 610, where a request is sent from a wireless device to a MC-WAP requesting data or voice services. In some implementations, a wireless device such as device 150 illustrated in FIG. 1 and FIG. 3 may send a request to multi-channel access point 120, illustrated in FIG. 1 and FIG. 2 to implement block 610. The process 600 then moves to block 615, where a response is received from the multi-channel access point. The response may include statistical information on a plurality of channels supported by the multi-channel wireless access point. This statistical information may include information on the number of wireless devices assigned to each channel supported by the multi-channel wireless access point. It may also include information on the physical rates of the devices assigned to the channels supported by the MC-WAP.

The physical rates of the devices assigned to each channel may be calculated based on transmissions from each device. When a device transmits a message to the MC-WAP, the MC-WAP may decode the message and estimate a signal to noise (SNR) or signal to interference plus noise (SINR) for the device. This information may be accumulated by the MC-WAP. For example, the MC-WAP may maintain an average SNR or SNIR for each device. A weighted average of SNR or SNIR may be maintained, with the weight based on the age of the SNR or SNIR measurement. The MC-WAP may also maintain a measurement of physical rate that is based on both a SNR and SNIR ratio. A portion of all of this data may be included in the statistical information.

The statistical information may also include other usage statistics on the channels supported by the MC-WAP. For example the statistical information may include the medium occupancy of each channel. It may also include the number of devices associated with each channel, or packet loss statistics for each device associated with each channel, or an average packet loss per channel. A packet loss rate may be based on the percent of packets received correctly by the MC-WAP over each channel. The statistics may also include latency statistics, such as mean/medium latency, or a latency statistic that is less than 99% of all the latencies experienced on the channel. The MAC throughput may also be included.

Note that while process 600 illustrates a wireless device receiving statistical information via a request to the MC-WAP (in block 610), and the reception of a reply in block 615, other implementations may provide statistical information to a wireless device in other manners. For example, in some implementations, a MC-WAP may periodically broadcast or multicast a beacon signal including statistical information. Some implementations of a MC-WAP may broadcast or multicast a plurality of types of beacon signals, each containing a portion of the statistical information disclosed herein.

The process 600 may then move to block 618, where data derived from the statistical information is compared to a threshold. In some implementations, the threshold may represent the minimum network performance that is required by the mobile device. For example, it may represent a minimum throughput, or a maximum latency. In some implementations, a mobile device implementing the process 600 may determine, in block 618, whether any of the channels supported by the wireless access point can provide the performance required by the mobile device.

For example, the wireless device implementing process 600 may obtain information on the bandwidth, throughput, or latency available on each of the channels supported by the multi-channel access point from the statistical information received in block 615. The mobile device may then compare its bandwidth, throughput, or latency requirements to data derived from the statistical information provided by the wireless access point in block 615. In some implementations, the wireless device may calculate or estimate the throughput using statistical information for each channel, such as medium occupancy, the number of existing wireless devices and their physical rates. In other implementations, this estimation may be performed by the MC-WAP, and a throughput metric included in the statistical information received in block 615.

In some implementations, the wireless device may calculate the packet loss rate and the latency statistics for each of the channels supported by the MC-WAP. The wireless device may then compare this information against its requirements.

The process 600 then moves to decision block 620 to determine whether the wireless device can select one of the plurality of possible channels depending on whether the threshold is met. In some implementations, the selection of the channel may be based on the statistical information provided by the wireless access point as described in block 615. If a determination is made that the comparison in block 618 indicates that a channel can be selected that meets the criteria, the process 600 moves to a block 622 to select a wireless channel from the plurality of possible channels. The process 600 then moves to block 630, where the multi-channel wireless access point is notified of the selected channel. The instructions or commands in the block 630 may be performed so as to at least enable the MC-WAP to reserve capacity on the selected channel for the wireless device executing the process 600. The process 600 then moves to end block 640.

If the comparison performed in block 618 indicates that there is not a channel available that can provide a performance level corresponding to the threshold, then process 600 moves from decision block 620 to end block 640.

It should be realized that if a determination is made that the comparison indicates that a channel cannot be selected that meets the criteria in decision block 620, the process 600 moves to the end block 640 and terminates the process for attempting to find a wireless channel.

Figure 7:
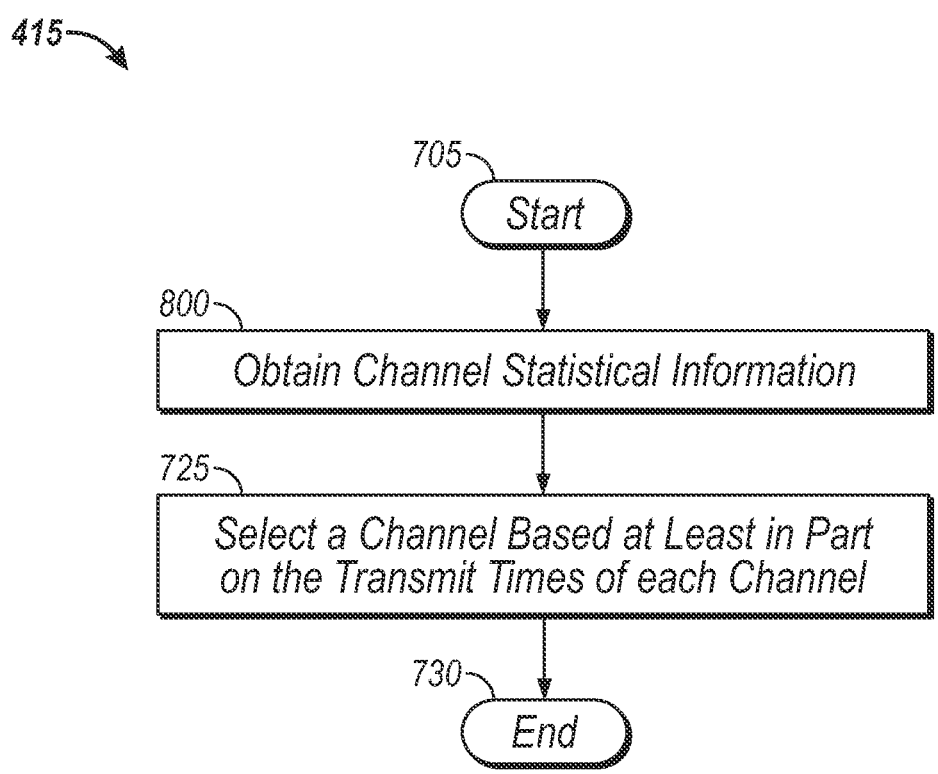
FIG. 7 is a flowchart for selecting a channel for a wireless device.

FIG. 7 is a flowchart showing additional details of the process block 415 shown in FIG. 4 that is used in a MC-WAP for selecting a channel for a wireless device. Process 415 may be implemented by processor instructions included in any of the modules of MC-WAP 120, illustrated in FIG. 2. For example, instructions in the channel selection module 256 and per channel statistics module 252 may implement the process 415. Alternatively, the process 415 may be implemented by any of the modules of wireless device 150, illustrated in FIG. 3. For example, process 415 may be implemented by instructions included in a channel selection module 356.

Process 415 begins at start block 705 and then moves to block 800 where channel statistical information is obtained. More detail on block 800 is provided below in the discussion of FIG. 8. Process 415 then moves to block 725 where a channel is selected based at least in part on transmit times of each channel. To select a channel based on the transmit times, process 415 may compare the transmit times or a metric derived from the transmit times to a performance threshold. Channels below the performance threshold may be removed from consideration for selection. If no channels are above the performance threshold, then no channel may be selected.

Other statistics may also be considered when selecting a channel. For example, the packet loss rate may be considered. The packet loss rate may be included in the statistical information obtained in block 800. Packet loss rate may be based on the percent of packets that are correctly received from each device assigned to a particular channel. Latency statistics, MAC throughput, or usage statistics for each channel may also be considered.

As part of the selecting of a channel, process 415 may also sort the channels by transmit time or by a metric derived from the transmit times. The channel with the most advantageous metric or transmit time may be selected.

Some implementations may consider user traffic patterns and quality of service requirements when selecting a channel. In these implementations, a channel may be selected for a wireless device if the available throughput meets the expectation of the wireless device. If none of the channels supported by the MC-WAP meet the requirements of the wireless device, no channel may be selected.

In some implementations, transmission times may be calculated as part of block 800. Alternatively, transmit times may be calculated by block 725 using the channel statistical information provided by block 800. After a channel is selected in block 725, or it is determined that no channel meets a performance threshold and thus no channel is selected, process 415 then moves to end block 730.

Figure 8:
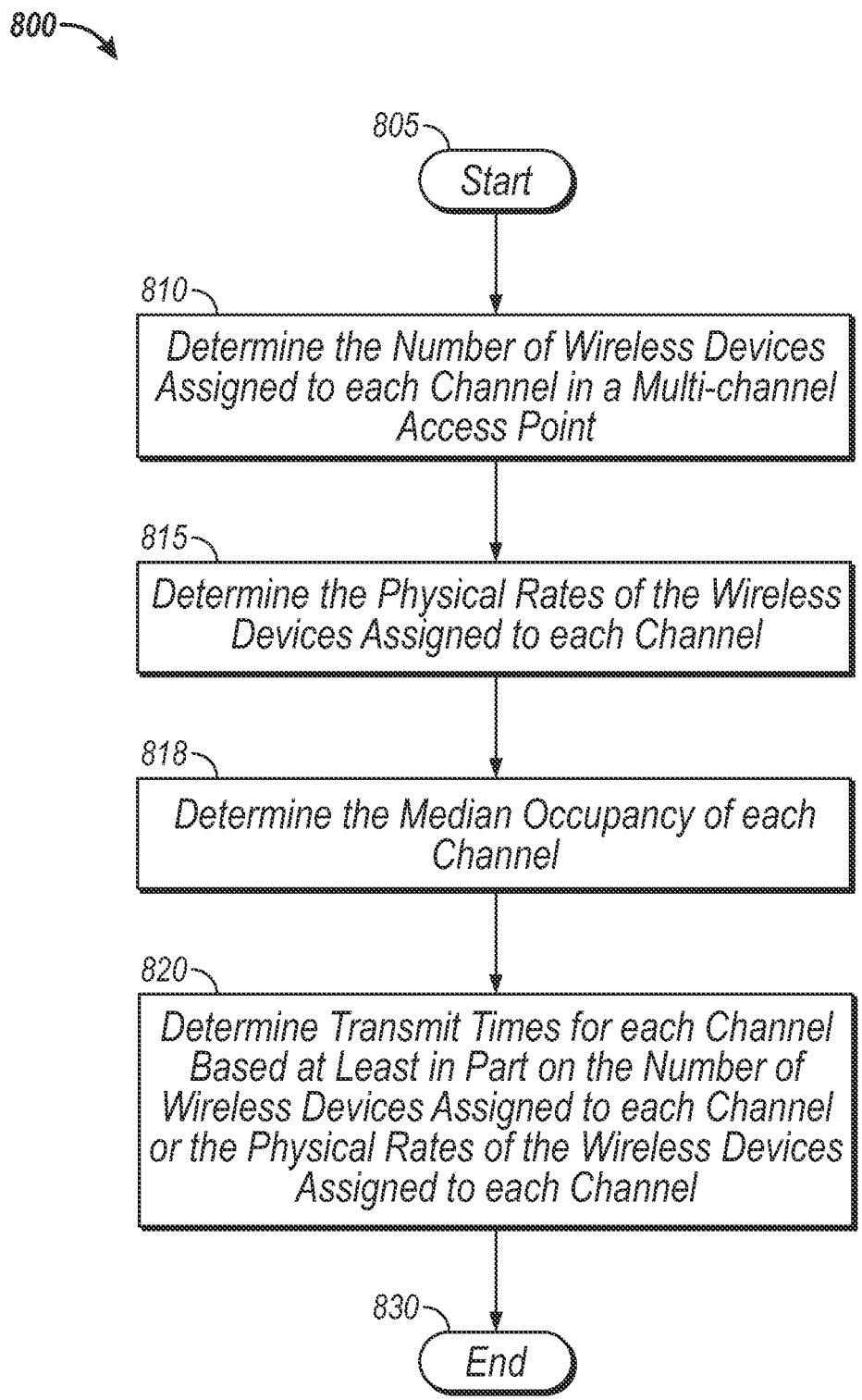
FIG. 8 is a flowchart of a process for obtaining channel statistics.

FIG. 8 is a flowchart of a process for obtaining channel statistics. Process 800 may be implemented by instructions included in the per channel statistics module 252 of the MC-WAP 120 illustrated in FIG. 2. Process 800 begins at start block 805 and then moves to block 810 where the number of wireless devices assigned to each channel in a multi-channel access point is determined. If implemented within the MC-WAP, block 810 may be implemented by recording when a device is assigned to a channel and then when the device is unassigned from the channel.

After the number of wireless devices assigned to each channel has been determined at block 810, the process 800 moves to block 815, where the physical rates of each wireless device assigned to each channel is determined. Block 815 may be implemented by instructions included in the physical rate determination module 254, illustrated in FIG. 2. The physical rates of the devices assigned to a channel may be at least partially based on the distance between the access point and the wireless devices. For example, wireless devices at a greater distance from a MC-WAP may experience larger path losses due to the greater power requirements and the necessity to transmit a signal over the larger distance. In one embodiment, the MC-WAP may track the path losses between wireless devices. The MC-WAP may then calculate the physical rates of each device based at least in part on the path losses between the MC-WAP and each wireless device.

The physical rates of the devices may also be estimated based on a signal to noise ratio (SNR) or a signal to interference plus noise ratio (SINR). For example, when a wireless device transmits data to an MC-WAP, the MC-WAP may calculate a SNR or SINR for the transmission. This information may be aggregated by the MC-WAP on a per device basis. For example, the MC-WAP may maintain an average or weighted average of the SNR or SINR ratios for each device on each channel. The MC-WAP may then determine an average SNR or SINR for the channel based on the measurements of the SNR or SINR for each device.

After determining the physical rates of connected wireless devices, the process 415 then moves to block 818, where the median occupancy of each channel supported by the MC-WAP is determined. Process 800 then moves to block 820, where the transmit times for each channel are determined based at least in part on the number of wireless devices assigned to each channel or the physical rates of the wireless devices assigned to each channel.

While the previous discussion of the process 800 included blocks 810, 815, and block 818, each block may be an optional portion of process 800. For example, in some implementations, the number of wireless devices assigned to each channel may not be considered when determining the transmit times for each channel. In these implementations, the block 810 may not be included in the process 815.

In some other implementations, the physical rates of each wireless device assigned to a channel may not be considered when determining the transmit times of each wireless device assigned to a channel. In these implementations, the block 815 may not be included in the process 800. In some implementations, the medium occupancy of each channel may not be part of the statistics collected in process 800. In these implementations, block 818 may not be included in process 800. After processing within block 820 is complete, process 800 moves to end block 830.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing modules, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method in a wireless device for selecting a channel for communicating with a multi-channel wireless access point providing data or voice service, comprising:
   transmitting a network request to the wireless access point for data or voice service;
   receiving a beacon signal from the wireless access point, the beacon signal carrying access information comprising one or more throughput metrics and one or more latency statistics, wherein said one or more latency statistics are based at least in part on one or more signal-to-noise ratio (SNR) or signal-to-noise-and-interference ratio (SNIR) measurements;
   determining whether, based on the access information, a channel is available that meets a quality of service requirement for a voice connection; and
   assigning the channel to offload the voice connection to the wireless access point if the channel is available that meets the quality of service requirement for the voice connection.

2. The method of claim 1, further comprising:
   comparing data derived from said one or more latency statistics to a threshold; and
   selecting one of the plurality of channels for data or voice traffic on the wireless device if the comparison indicates a channel can provide a performance level corresponding to the threshold.

3. The method of claim 1, wherein said one or more throughput metrics include the number of active connections for each of the plurality of channels.

4. The method of claim 1, wherein said one or more throughput metrics include a medium occupancy of each of the plurality of channels and the method includes selecting one of the plurality of channels based on the medium occupancy of each of the plurality of channels.

5. The method of claim 1, wherein said one or more throughput metrics include representations of the physical rates of each device assigned to each of the plurality of channels, and the method includes selecting one of the plurality of channels based on the representations of the physical rates.

6. The method of claim 1, wherein said one or more throughput metrics include a transmit time for each of the plurality of channels, and the method includes selecting one of the plurality of channels based on the transmit time for each of the plurality of channels.

7. The method of claim 6, wherein a transmit time of a channel is based at least in part on the physical rates of devices assigned to the channel.

8. The method of claim 6, wherein a transmit time of a channel is based at least in part on the number of active connections on the channel.

9. A wireless device, comprising:
   a wireless transmitter;
   a wireless receiver;
   a transmit module, configured to make a request to a multi channel wireless access point for data or voice services;
   a receive module, configured to receive a beacon signal from the multi-channel wireless access point, the beacon signal carrying access information comprising one or more throughput metrics and one or more latency statistics, wherein said one or more latency statistics are based at least in part on one or more signal-to-noise ratio (SNR) or signal-to-noise-and-interference ratio (SNIR) measurements; and
   a processor, configured to determine whether, based on the access information, a channel is available that meets a quality of service requirement for a voice connection, and to assign the channel to offload the voice connection to the wireless access point if the channel is available that meets the quality of service requirement for the voice connection.

10. The wireless device of claim 9, further comprising a channel selection module configured to select a channel from the plurality of channels based at least in part on said one or more throughput metrics and a comparison of data derived from said one or more latency statistics to a threshold.

11. The wireless device of claim 10, wherein said one or more throughput metrics include at least the transmit time for each of the plurality of channels, and the channel selection module is further configured to select a channel based on the transmit times.

12. The wireless device of claim 11, wherein a transmit time of a channel is based at least in part on the physical rates of the devices assigned to the channel.

13. The wireless device of claim 11, wherein the wireless device is a wireless telephone.

14. A wireless apparatus, comprising:
   means for transmitting a network request to the wireless access point for data or voice service;
   means for receiving a beacon signal from the access point, the beacon signal carrying access information comprising one or more throughput metrics and one or more latency statistics, wherein said one or more latency statistics are based at least in part on one or more signal-to-noise ratio (SNR) or signal-to-noise-and-interference ratio (SNIR) measurements;
   means for determining whether, based on the access information, a channel is available that meets a quality of service requirement for a voice connection; and
   means for assigning the channel to offload the voice connection to the wireless access point if the channel is available that meets the quality of service requirement for the voice connection.

15. The wireless apparatus of claim 14, further comprising:
means for comparing data derived from said one or more latency statistics to a threshold; and
means for selecting one of the plurality of channels for data or voice traffic on the wireless device if the comparison indicates a channel can provide a performance level corresponding to the threshold.

16. A non-transitory, computer readable medium including instructions that when executed by a processor, cause the processor to:
transmit a network request to a multi-channel wireless access point for data or voice service;
receive a beacon signal from the multi-channel wireless access point, the beacon signal carrying access information comprising one or more throughput metrics and one or more latency statistics, wherein said one or more latency statistics are based at least in part on one or more signal-to-noise ratio (SNR) or signal-to-noise-and-interference ratio (SNIR) measurements;
determine whether, based on the access information, a channel is available that meets a quality of service requirement for a voice connection; and
assign the channel to offload the voice connection to the wireless access point if the channel is available that meets the quality of service requirement for the voice connection.

17. The computer readable medium of claim 16, further including instructions that when executed by a processor, cause the processor to:
compare data derived from said one or more throughput metrics latency statistics to a threshold; and
select one of the plurality of channels for data or voice traffic on the wireless device if the comparison indicates a channel can provide a performance level corresponding to the threshold.

18. A method of assigning a wireless device to a channel in a multi-channel access point, comprising:
receiving a network request from a wireless device for data or voice services;
determining the transmit times for a plurality of channels, one or more latency statistics and one or more throughput metrics, wherein said one or more latency statistics are based at least in part on one or more signal-to-noise ratio (SNR) or signal-to-noise-and-interference ratio (SNIR) measurements;
determining whether, based at least in part on the transit times, said one or more latency statistics and one or more throughput metrics, a channel is available that meets a quality of service requirement for a voice connection;
assigning the channel to offload the voice connection to the wireless access point if the channel is available that meets the quality of service requirement for the voice connection; and
transmitting a beacon signal to the wireless device indicating the assigned channel.

19. The method of claim 18 wherein a transmit time of a channel is based on the number of wireless devices assigned to the channel.

20. The method of claim 18, wherein a transmit time of a channel is based at least in part on the physical rates of wireless devices assigned to the channel.

21. The method of claim 18, wherein said one or more throughput metrics include a channel performance requirement and the channel is assigned based at least in part on the channel performance requirement.

22. The method of claim 21, wherein the channel performance requirement includes the quality of service requirement for the voice connection.

* * * * *